United States Patent [19]
Stanley

[11] 3,894,708
[45] July 15, 1975

[54] POWER SEAT ARRANGEMENT

[75] Inventor: Richard B. Stanley, Rolling Meadows, Ill.

[73] Assignee: World-O-Matic Corporation, Chicago, Ill.

[22] Filed: Nov. 29, 1973

[21] Appl. No.: 419,979

[52] U.S. Cl. ............... 248/394; 248/395; 248/421
[51] Int. Cl. ........................................ F16m 11/10
[58] Field of Search ...................... 248/393–396, 248/398, 419, 421; 297/346; 108/138

[56] References Cited
UNITED STATES PATENTS

| | | | |
|---|---|---|---|
| 2,809,688 | 10/1957 | Brundage | 248/419 |
| 2,919,744 | 1/1960 | Tanaka | 248/419 |
| 2,929,439 | 3/1960 | Tanaka et al. | 248/393 |
| 2,931,424 | 4/1960 | Pickles | 248/419 |
| 3,022,035 | 2/1962 | Pickles | 248/395 |
| 3,033,510 | 5/1962 | Hollar et al. | 248/394 |
| 3,319,921 | 5/1967 | Nichols | 248/394 |
| 3,405,900 | 10/1968 | Robinson | 248/396 |
| 3,712,573 | 1/1973 | Pickles | 248/394 |

FOREIGN PATENTS OR APPLICATIONS

| | | | |
|---|---|---|---|
| 730,944 | 3/1966 | Canada | 248/419 |

*Primary Examiner*—Roy D. Frazier
*Assistant Examiner*—Lawrence J. Staab
*Attorney, Agent, or Firm*—Beaman & Beaman

[57] ABSTRACT

A power seat arrangement for automobiles and the like comprising a base defining an operating way, which base operatively mounts a pair of oppositely acting bell crank levers that each have one set of arms pivotally connected to the movable seat frame to support and position same relative to the base, and a second set of arms operatively connected to an actuator mechanism for operating the bell crank levers. The actuator mechanisms for both the bell crank levers are independently operable and both include a power driven bearing unit that both cooperate with the same threaded shaft that extends longitudinally of the direction of horizontal adjustment of the seat. The bell crank levers are mounted so that their swing axes may shift longitudinally of the operating way, and their second sets of levers have a floating force transmitting connection with the respective actuator mechanisms, whereby when the bell crank levers are operated in an equal but opposite manner by said actuator mechanisms, the frame is adjusted vertically relative to the base, movement of the seat longitudinally of its way is achieved by actuator devices operating in unison in the same direction, while tilting of the seat forwardly or rearwardly is obtained by individual operation of the actuator devices.

10 Claims, 9 Drawing Figures

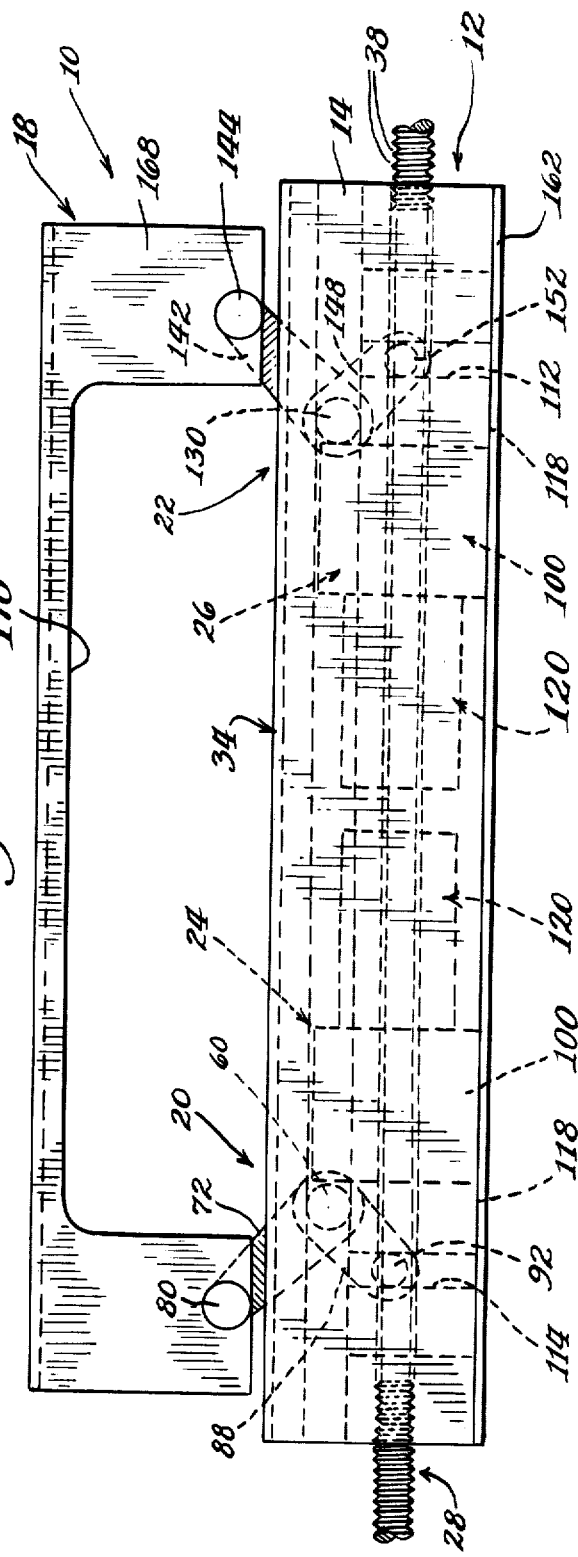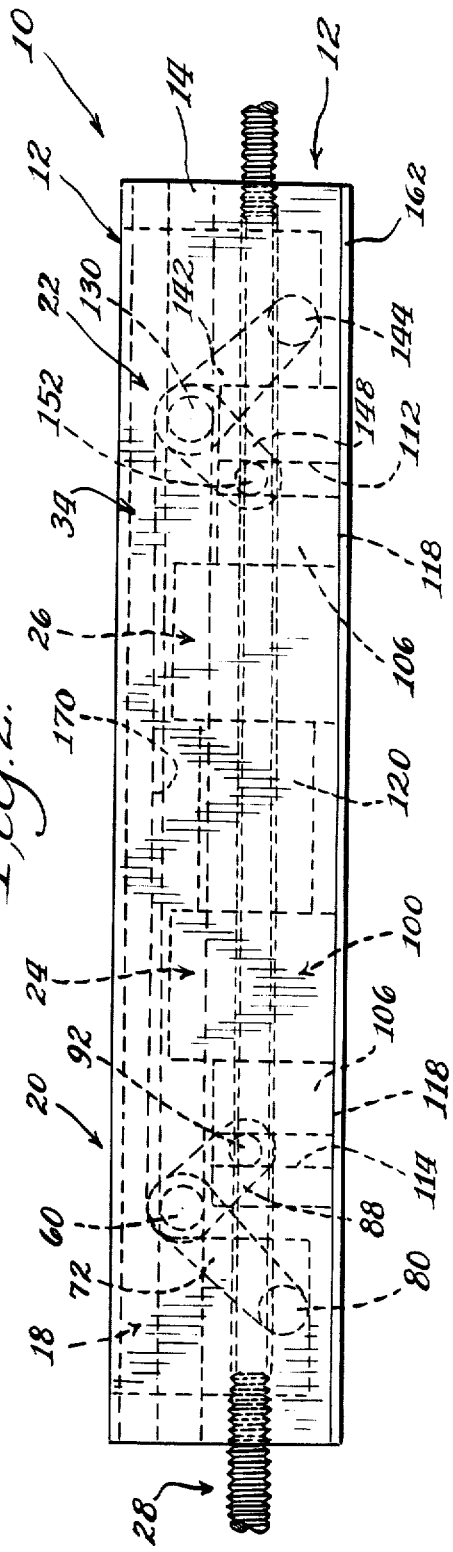

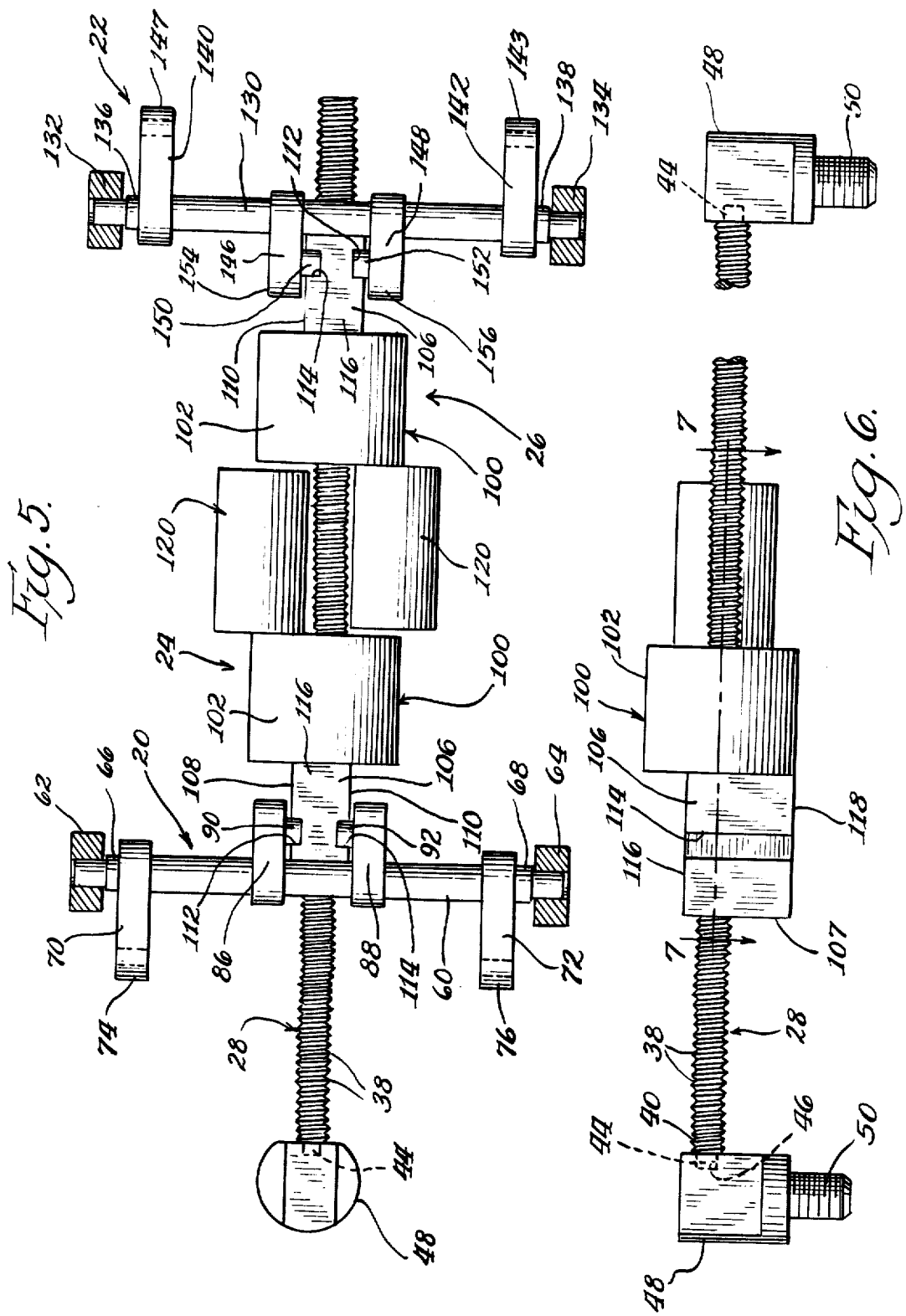

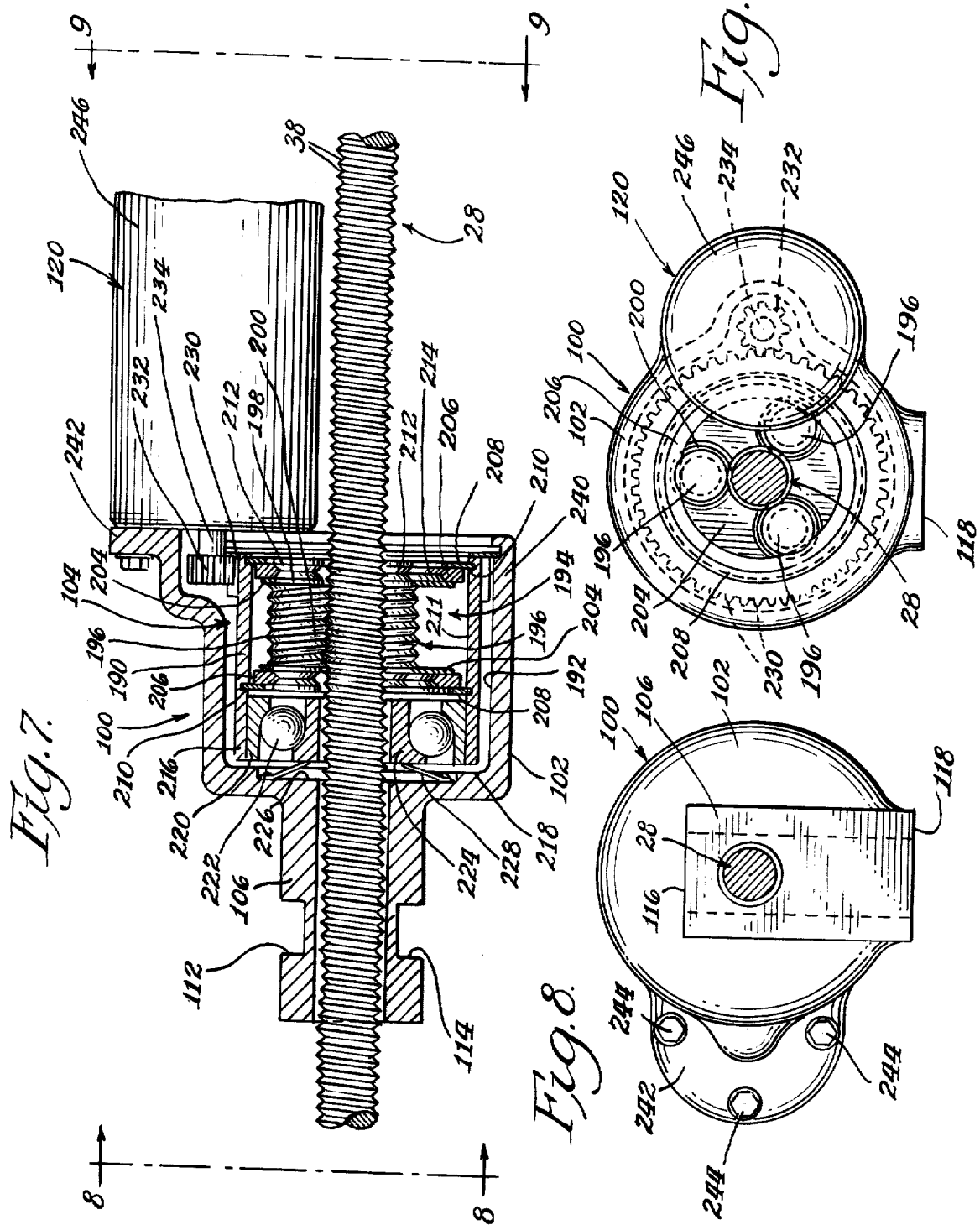

POWER SEAT ARRANGEMENT

This invention relates to power seats for automobiles and the like, and more particularly, to a power seat arrangement provided for power adjustment of the seat for maximum driver comfort.

Power seat arrangements, such as those serving as the front seat for automobiles, conventionally are provided with power operated mechanisms to raise and lower the seat, and move it forwardly and rearwardly of the car, so that the operator can adjust the position of the seat relative to the car front window, steering wheel, and other controls for maximum operator comfort and convenience.

Prior art devices of this type are generally characterized by their complexity and accompanying tendencies to frequent break downs and high maintenance costs, because of the nature of the shafting, gearing, bearings, and motor controls therefor.

A principal object of the invention is to provide a power seat arrangement that not only is of few and simple parts, and is reliable in operation, but which also provides a six way actuation action for adjustment purposes.

Another principal object of the invention is to provide a power seat arrangement in which the seat frame is supported by a pair of oppositely acting bell crank levers arranged to selectively provide rectilinear vertical and horizontal movement for adjusting the seat height and spacing forwardly and rearwardly of the vehicle, and to provide a rocking motion to tilt the seat forwardly or rearwardly, as desired by the operator.

Other objects of the invention are to provide a power seat arrangement that is of general application, and to provide a power seat arrangement that is economical of manufacture, convenient to install and use, and long lived in operation.

In accordance with this invention, a power seat arrangement for automobiles and the like is provided comprising a base plate defining an operating way and opposed guideways paralleling and extending on either side of same, in which a pair of oppositely acting bell crank levers are mounted for swinging movement and shifting movement longitudinally of the operating way, with the bell crank levers each having one set of arms pivotally mounted to the seat frame that overlies the base plate, and a second set of arms operatively connected to an actuator mechanism for operating the respective bell crank levers. The actuators for both the bell crank levers cooperate with a simple fixed screw type guide shaft that extends longitudinally of the direction of horizontal adjustment of the seat, and each actuator includes its own power driven bearing unit that cooperates with the guide shaft threads to actuate independently the two bell crank shafts involved to get the adjustment desired. The bell crank levers are roller mounted in the indicated guideways so that their swing axes may shift longitudinally of the operating way under the operation of the actuation devices, and their second set of levers have a floating force transmitting connection with the respective actuator mechanisms, whereby when the bell crank levers are operated in an equal but opposite manner, by operating the actuator mechanisms therefor in that manner, the seat frame is adjusted vertically, while operation of the actuator mechanisms in unison in the same direction will move the seat horizontally.

Other objects, uses and advantages will be obvious or become apparent from a consideration of the following detailed description and the application drawings.

In the drawings:

FIG. 1 is a diagrammatic side elevational view illustrating the basic operating components of the invention, with the seat frame being diagrammatically represented and shown in its raised position;

FIG. 2 is a view similar to that of FIG. 1 but showing the seat frame in its lowered position;

FIG. 5 is a plan view of the basic operating parts of the seat arrangement, with the seat frame and base plate omitted;

FIG. 6 is a fragmental side elevational view of the threaded shaft and the left hand actuator mechanism cooperating therewith, that are shown in FIG. 5, with the bell crank levers shown in FIG. 5 being omitted;

FIG. 7 is a fragmental sectional view taken substantially along line 7—7 of FIG. 6, but on an enlarged scale and with parts shown in elevation;

FIG. 8 is an end elevational view of the structure shown in FIG. 7, taken substantially along line 8—8 of FIG. 7; and FIG. 9 is an end view of the component shown in FIG. 7, taken substantially along line 9—9 of FIG. 7, with parts shown in phantom.

Figure 3:
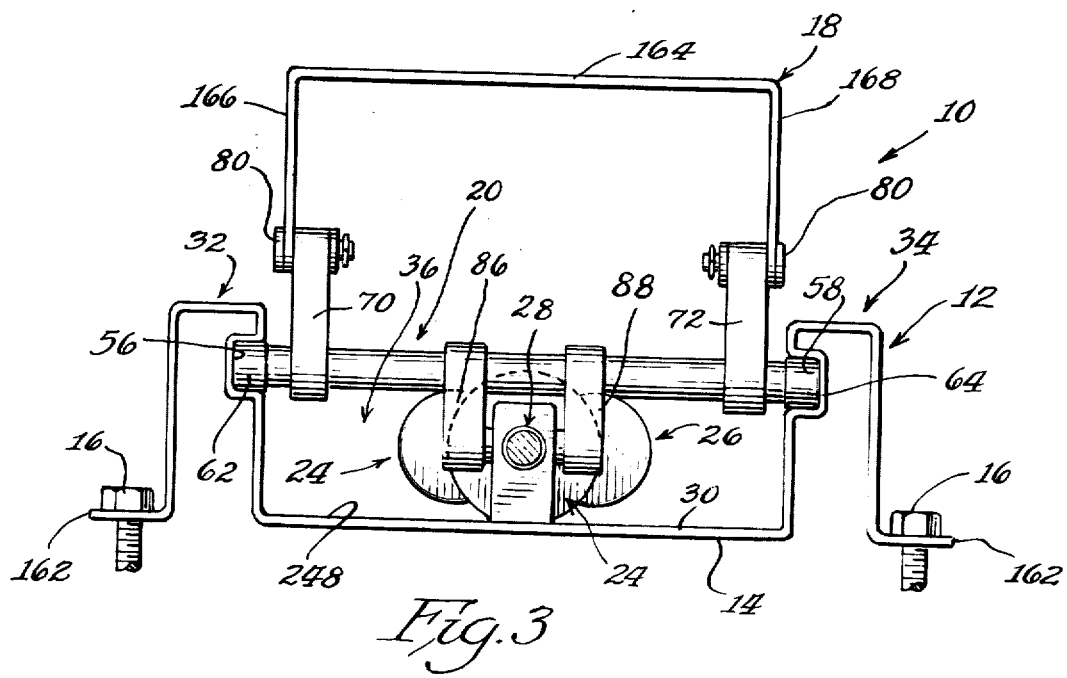
FIG. 3 is an end view of the arrangement that is shown in FIG. 1, taken from the left hand end of FIG. 1.

However, it is to be distinctly understood that the specific drawing illustrations provided are supplied primarily to comply with the requirements of the Patent Laws, and that the invention may have other embodiments that will be obvious to those skilled in the art.

GENERAL DESCRIPTION

Reference numeral 10 of FIGS. 1 – 4 generally indicates a diagrammatically illustrated embodiment of the invention comprising a base 12 in the form of a base plate 14 that is shown to be affixed to the automobile floor line by suitable bolts 16, a seat frame 18 on which the framing and cushion padding of the automobile seat are to be applied in any suitable manner, a pair of oppositely acting bell crank lever assemblies 20 and 22 operatively interposed between the base 12 and seat frame 18 for supporting the seat frame 18 from the base 12, a pair of actuator mechanisms 24 and 26 that actuate the bell crank lever assemblies 20 and 22, and a guide shaft 28 with which the actuator mechanisms 24 and 26 cooperate in accordance with this invention to actuate the bell crank lever assemblies.

Figure 4:
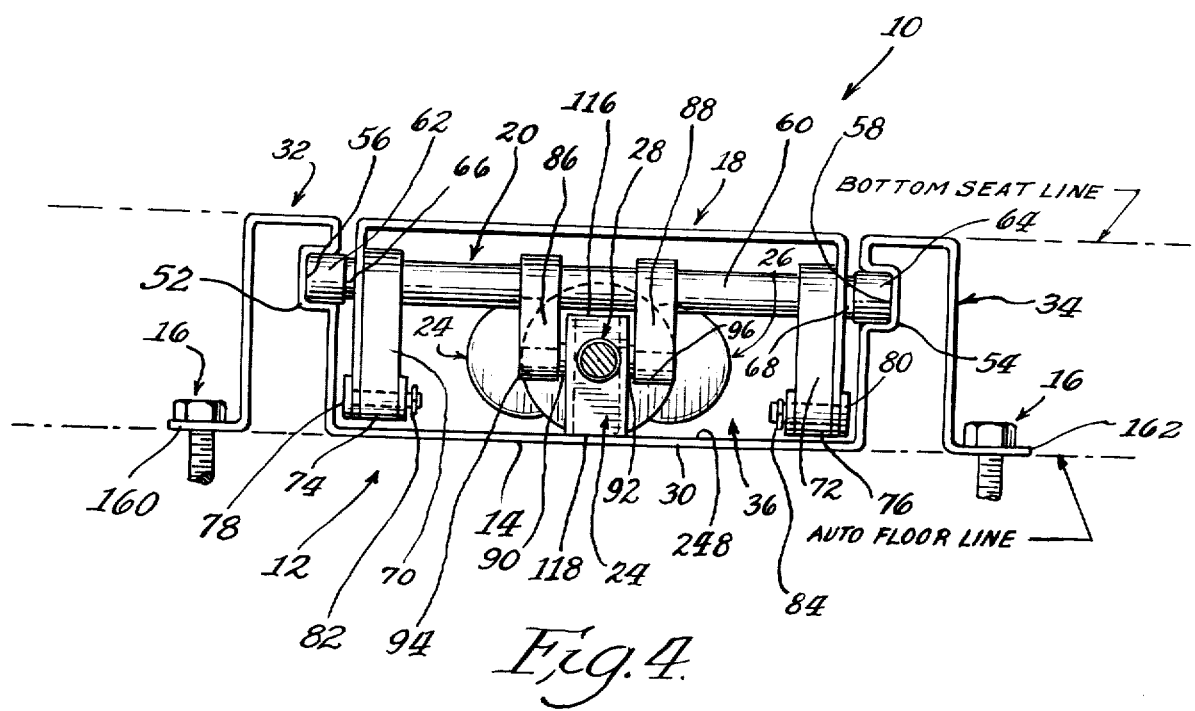
FIG. 4 is similar to FIG. 3, but showing the seat arrangement in its fully lowered position.

As indicated in FIGS. 3 and 4, the base plate 14 defines a flat or planar median portion 30 and upstanding side portions 32 and 34 on either side of same which define an operating way 36 that extends longitudinally of the base plate 14, and in which the actuator mechanisms 24 and 26 and guide shaft 28 are mounted.

The guide shaft 28 extends longitudinally of the base plate and along the center line thereof. In the form shown, shaft 28 is formed with threading 38, and at the resepective ends 40 and 42 of same, is formed with end projections 44 of polygonal (square in the illustrated embodiment) transverse cross-sectional configuration for reception in the respective recesses 46 of suitable lug structures 48 (see FIG. 6) that in the form shown are anchored to the automobile floor by having threaded shanks 50 thereof turned into the automobile floor. Thus, the guide shaft 28 is fixed against rotation in accordance with the illustrated embodiment of the invention.

The side portions 32 and 34 of the base plate 12 are indented as indicated at 52 and 54, respectively, in the showing of FIGS. 3 and 4, to define the respective opposed guideways 56 and 58 that extend the length of base plate 14, in which the respective bell crank lever assemblies 20 and 22 are operatively mounted.

The bell crank lever assembly 20 generally comprises a rock shaft 60 having rollers 62 and 64 journaled on the respective ends 66 and 68 of same that ride in the respective guideways 56 and 58 for movement longitudinally thereof, in accordance with this invention. The shaft 20 has fixed adjacent either end of same the respective lever arms 70 and 72 which have their projecting ends 74 and 76 suitably pivotally connected to the seat frame 18, as by employing the diagrammatically illustrated pins 78 and 80 (held in place by suitable cotter pins 82 and 84, respectively).

The bell crank lever assembly 20 also includes adjacent its median portion a pair of spaced apart lever arms 86 and 88 having the respective rollers 90 and 92 suitably journaled in their projecting ends 94 and 96 for cooperation with the actuator mechanism 24.

The actuator mechanism 24 generally comprises a housing 100 defining a generally round or cylindrical portion 102 in which is operatively mounted a drive mechanism 104 (see FIG. 7) that operatively engages the guide shaft 28, and a projecting housing portion 106 of generally quadrilateral transverse cross-sectional configuration, through which the guide shaft 28 extends, and in the planar sides 108 and 110 of same are formed the oppositely facing slots or guideways 112 and 114 in which the respective rollers 90 and 92 are operatively received.

The housing portion 106 also defines planar end wall 107 through which shaft 28 extends and upper and lower planar surfaces 116 and 118, with the lower surface 118 being in free sliding engagement with the base plate 14 to hold the actuator assembly 24 against rotation relative to guide shaft 28 when drive mechanism 104 is operating. The upper surface 116 is disposed to readily fit under the cross shaft 60 (see FIGS. 1 and 2).

Operatively secured to the housing portion 102 is motor assembly 120, which preferably includes an electrically powered rotary reversible motor suitably coupled to the drive mechanism 104.

The bell crank lever assembly 22 and its associated parts are generally similar to the corresponding components of the bell crank assembly 20 that have just been described.

Thus, bell crank assembly 22 comprises cross shaft 130 journaling rollers 132 and 134 at its end portions 136 and 138, respectively, which rollers are received in the respective guideways 56 and 58, the cross shaft 130 at either end of same has affixed thereto the respective lever arms 140 and 142 which at their projecting ends 141 and 143 are respectively pivotally connected to the seat frame 18, as by employing suitable pins 144 (held in place by cotter pins similar to those of shaft 60). Cross shaft 130 has affixed thereto adjacent its median portion a pair of spaced apart lever arms 146 and 148 having suitable rollers 150 and 152 suitably journaled at their projecting end portions 154 and 156 for operative association with the actuation mechanism 26.

The actuation mechanism 26 is the same as actuation mechanism 24 and corresponding reference numerals have been employed to indicate corresponding parts, it being kept in mind that the housing portion 102 of the action mechanism is equipped with a drive mechanism 104 that is not shown.

The actuator mechanisms 24 and 26 and bell crank assemblies 20 and 22 are operatively assembled with the base plate 14 and the seat frame 18 in the manner indicated in the drawings, with the result that the bell crank assemblies 20 and 22 are oppositely acting when the actuation assemblies 24 and 26 are moved in opposite angular directions. Shafts 60 and 130 also move lengthwise of the guide shaft 28, when the assemblies 20 and 22 are actuated to move the seat frame 18 between its raised and lowered positions of FIGS. 1 - 4. In so doing, the actuation mechanisms 24 and 26, by reason of the floating force transmitting connection that the respective bell crank lever arms 86, 88, 146 and 148 make with the respective housing portions 106, act on the respective lever arms 86 and 88 and 146 and 148 to swing the seat frame vertically. Under the reaction of the swinging action involved, due to the pivotal connection of the lever arms 70 and 72, and 140 and 142 to the seat frame, the rock shafts 60 and 130 move longitudinally of the guideways 56 and 58 as the seat frame is moved between the positions of FIGS. 1 - 4.

Assuming that the seat frame 18 is in the lowered position of FIGS. 2 and 4, by operating the actuation assemblies 24 and 22 so that they move simultaneously and in unison (or at the same speed) away from each other (that is, to the left and to the right of FIG. 5), the bell crank assemblies 20 and 22 are rotated clockwise and counterclockwise, respectively, to move the seat frame to its elevated position of FIGS. 1 and 3, with the seat frame 18 moving straight up vertically (pins 80 and 144 moving in a straight line manner) because of the particular mounting arrangement of the bell crank assemblies 20 and 22 that is involved. Under this action, as the lever arms 86, 88, 146 and 148 of the bell crank assemblies (which are engaged by the respective actuation mechanisms 24 and 26) move between the positions of FIG. 1, such lever arms (and in particular, their rollers 90, 92, 150 and 152) move longitudinally of the respective guide slots 112 and 114, and the rock shafts 60 and 130 move longitudinally of the guideways 56 and 58 toward each other and then return to the spaced position shown in FIG. 1. Returning of the seat frame 18 to the lowered position of FIGS. 2 and 4 is accomplished in a similar manner with the actuation assemblies 24 being moved in unison (simultaneously and at the same speed) toward each other.

When the actuation assemblies 24 and 26 move in the same direction (which should be done simultaneously and at the same speed), the bell crank assemblies 20 and 22 are moved longitudinally of the guideways 56 and 58 in the same direction to move the seat frame 18 in a rectilinear manner horizontally. This could be done in any position of elevation of the seat frame relative to the base plate 14, and, of course, in either direction since motors 120 may be vertically driven.

Tilting of the seat frame 18 forwardly and rearwardly can be accomplished by actuating the mechanism 24 and the mechanism 26 separately, depending on whether the front or the rear of the seat is to be tilted, and the location of the respective actuation mechanisms 24 and 26 relative to the front and rear of the seat. For instance, assuming that the bell crank assembly 20 is under the rear of the seat, by operating the actuation mechanism 24 to dispose its lever arms at positions intermediate the two extreme positions indicated in FIGS. 1 and 2, the rear of the seat can be elevatedly positioned as desired to provide the chair tilt desired (the seat frame pivoting about pins 144). Similar remarks apply to bell crank assembly 22 and its actuation mechanism 26.

In the form shown, the mechanisms 24 and 26 engage to define the lowered position of the frame 18, and motors 120 engage the respective rock shafts 60 and 130 (see FIG. 1 to define the raised position of the frame 18). However, other movement limiting stop arrangements may be employed instead, if so desired.

SPECIFIC DESCRIPTION

The base plate 14 may be formed of any suitable sheeting material (metallic or plastics) having the requisite strength, which sheeting material is suitably shaped to the configurations indicated in FIGS. 1 – 4 of the drawings so as to define the operating way 36 and guideways 56 and 58. The side portions 32 and 34 of same are preferably formed along the lower outer edges of same with the laterally projecting side flanges 160 and 162 to which the bolts 16 or other suitable securing devices are applied to mount the base plate 14 in operating position (bolts 16 are omitted from the showing of FIGS. 1 and 2).

The seat frame 18 is of generally channel shaped transverse cross-sectional configuration in the form illustrated, it defining web 164 and side flanges 166 and 168, with the pins 78 and 144 being applied to the respective side flanges at the ends thereof. As indicated in FIGS. 1 and 2, the side flanges 166 and 168 are notched as indicated at 170 to receive the cross shafts 60 and 130 when the seat frame is moved to its lowered position (see FIG. 2). Frame 18 may be formed of any suitable material having the requisite strength (plastic or metallic).

The usual seat framing and padding structure is suitably applied to the seat frame 18 in any convenient manner, but is omitted from the drawings to simplyfy same.

The usual seat framing and padding structure is suitably applied to the seat frame 18 in any convenient manner, but is omitted from the drawings to simplify same.

Referring now to FIGS. 7 – 9, the drive mechanism 104 is preferably one of the types described in my application Ser. No. 398,587, filed Sept. 19, 1973, the disclosure of which is hereby incorporated herein by reference. The device 104 thus comprises a tubular member 190 operatively disposed within a bearing unit chamber 192 within housing portion 102, with bearing unit 194 being operatively mounted within the tubular member 190 in operative association with the guide shaft 28, and in particular, with its threading.

The bearing unit 194 includes a plurality of rollers 196 (three in the illustrated embodiment, although only two are shown in FIG. 7) having their shanks 198 threaded as indicated at 200 for meshing engagement with the threading 38 of the guide shaft 28. The rollers 196 are received within and between retainer rings 204, and ride on thrust rings 206, of the type described in my said application, which thrust rings 206 are respectively engaged with suitable lock rings 208 mounted in the respective grooves 210 formed in the internal surface 211 of the housing member 190.

As disclosed in my said application, the thrust rings 206 and rollers 196 have tongue and groove type force transmitting connection at the roller ends, wherein the roller ends are grooved as at 212 to receive the internal V ridge 214 of the thrust rings 206.

In the embodiment of FIGS. 7 – 9, the end 216 of the tubular member 190 is journaled on thrust bearing assembly 218 which generally comprises an outer race 220 that is fixed with respect to the tubular member 190, a plurality of bearing balls 222, and an inner race 224, that is separated from the outer race by the bearing balls 222. Interposed between the inner race 224 and the housing end wall 226 is a suitable spring device, such as the wave washer 228 that is illustrated, to resiliently take the load that is applied to the inner race 224 during operation of the device when the housing 100 (of FIG. 7) is moved to the right of FIG. 7. Bearing balls 222 are held in the usual spaced relation by a suitable retainer (not shown).

The tubular member 190 is formed with suitable gear teeth 230 that is driven by motor 120. Motor 120 is preferably of the reversibly operated type so that the motor can be driven in either direction with facility.

As is also indicated in my said application, the threading 200 of the rollers 196 and the threading of the shaft 28 has identical helical angles but is of opposite hand. The pitch diameter of the rollers is substantially equal to but different from that of the shaft 28, with the pitch diameter being lesser or greater than the pitch diameter of the shaft in proportion to the linear movement or net lead that is to be provided by the actuation mechanisms 24 and 26.

When motor 120 is operated to rotate the tubular member 190 through spur gear 232 and gearing 230, the bearing unit 190 effects a nut like action on the stationary guide shaft 28 to move the actuator mechanism involved to the right or to the left, depending on the direction of rotation.

As indicated in FIGS. 7 – 9, the housing 100 is formed to define a suitable rim portion 240 within which the tubular member gearing 230 is disposed, and has a protuberant portion 242 to which the motor 120 is suitably secured by employing appropriate bolts 244 or the like. The motor 120 comprises suitable housing 246 in which an appropriate motor unit (not shown) is suitably mounted that drives motor shaft 234. Housing portion 102 is open as at 235 to expose bearing unit 194, but in practice this may be closed by a suitable end plate, suitably apertured to pass shaft 28.

The portion 106 of housing 100 is of generally parallelepiped configuration wherein the lower planar surface 118 is shaped for complementarily engaging with the upwardly facing surface 248 of the base plate for holding housing 100 against rotation under the action of bearing unit 194 when operating. This cooperation between these surfaces as well as guide shaft 28 also guides the movement of the respective actuator mechanisms longitudinally of the operating way 36.

While the drive mechanism 104 that is illustrated is preferred, it may also take one of the forms disclosed in my application Serial No. 344,198, filed March 23, 1973, or some conventional rotary device that converts the rotary motion involved into linear movement of the actuation mechanisms 24 and 26.

It will therefore be seen that this invention provides a power seat arrangement in which the seat may be adjusted six ways, as by being raised or lowered, moved in either direction longitudinally of the vehicle, or tilted forwardly or rearwardly of the vehicle, by actuating the simple but effective actuator mechanisms and bell crank assemblies associated therewith. The device is simple but effective in operation that is characterized by its sturdiness of construction and fewness of parts.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A power seat arrangement comprising, a fixed base defining a rectilinear operating way, a shaft fixed with respect to said base extending in and longitudinally of said way, a pair of oppositely acting bell crank levers positioned in said way and spaced apart longitudinally of said way, said bell crank levers operating about axes extending crosswise of said way, means mounting said bell crank levers for movement on said base substantially parallel to said way, a seat frame positioned in vertical alignment with said way, with one arm of each bell crank lever being pivotally connected to said seat frame, an actuator mechanism for each bell crank lever disposed in said way, with the other arm of the respective bell crank levers being connected to the actuator mechanism therefor, said actuator mechanisms operatively engaging said shaft for movement thereof longitudinally of said shaft on actuation of the respective mechanisms, and power means for selectively driving said actuator mechanisms to move same longitudinally of said way to swing said levers about their said axes for shifting said seat frame relative to said base.

2. The power seat arrangement set forth in claim 1 wherein:

said shaft is externally threaded, said power means for each actuator mechanism comprising rotary motor means coupled to the respective actuator mechanisms for driving same, said actuator mechanisms each including means for converting rotary motion provided by said motor means to linear motion of said actuator mechanisms longitudinally of said way under the action of said mechanisms operatively engaging said shaft, and means for holding said actuator mechanisms against rotational movement.

3. A power seat arrangement comprising, a base defining a rectilinear operating way, an externally threaded shaft fixed against movement and extending in and longitudinally of said way, a pair of oppositely acting bell crank levers positioned in said way and spaced apart longitudinally of said way, opposed rectilinear guideways disposed on either side of said operating way in which said levers are journaled, said bell crank levers operating about axes extending crosswise of said way, a seat frame positioned in vertical alignment with said way, with one arm of each bell crank lever being pivotally connected to said seat frame, an actuator mechanism for each bell crank lever disposed in said way, said other arms of said levers making a shifting motion transmitting connection with the respective actuator mechanisms that is rectilinear in nature and directed normally of said way and vertically of said arrangement, said actuator mechanisms operatively engaging said shaft for movement thereof longitudinally of said shaft on actuation of the respective mechanisms, whereby when said actuator mechanisms are driven in opposite directions, said seat frame is moved vertically of said base and said levers shift longitudinally of said guideways, means for holding said actuator mechanisms against rotational movement, and power means for selectively driving said actuator mechanisms to move the same longitudinally of said way to swing said levers about their said axes for shifting said seat frame relative to said base, said power means for each actuator mechanism comprising rotary motor means coupled to the respective actuator mechanism for driving the same, said actuator mechanisms each including means for converting rotary motion provided by said motor means to linear motion of said actuator mechanisms longitudinally of said way under the action of said mechanisms operatively engaging said shaft.

4. A power seat arrangement comprising:

a base defining a rectilinear operating way, a guide shaft extending longitudinally and centrally of said way, a pair of rock shafts extending crosswise of said way in parallel spaced apart relation, said rock shafts being coplanar in a plane paralleling said way, said rock shafts at their ends being mounted for shifting movement longitudinally of said way, a seat frame positioned above said way and over said shafts, said rock shafts each having a first bell crank arm pivotally connected to said seat frame and a second bell crank arm, an actuator device for each rock shaft, said actuator devices each comprising a housing received over said guide shaft and including means for selectively and independently moving the respective devices longitudinally of said guide shaft in either direction, said housings each defining an external vertical slot with the second bell crank arm of the respective rock shafts having a floating force transmitting connection with the respective housing slots for applying to the respective second bell crank arms the motion of said housings, said rock shafts and said arms being disposed to define oppositely acting bell crank levers, whereby when said actuator devices are moved longitudinally of said guide shaft in oppste directions said seat frame is moved vertically of said base.

5. A power seat arrangement comprising:

a base defining a rectilinear operating way, a threaded guide shaft disposed within said way and extending longitudinally and centrally thereof, said shaft being fixed against rotation, a seat frame positioned over said way, a pair of rock shafts extending crosswise of said way in parallel spaced apart relation, said shafts being coplanar in a plane paralleling said way, said rock shafts having their ends supported for shifting movement longitudinally of said way, said rock shafts each having a first bell crank arm pivotally connected to said seat frame and a second bell crank arm for actuating the respective rock shafts, an actuator device for each rock shaft operably connected to the respective second bell crank arms, said actuator devices each comprising a housing received over said guide shaft and including rotary power drive means for selectively and independently actuating said devices and rotating driven means operably engaging said guide shaft for converting rotary motion of same to linear motion of said devices longitudinally of said way, said housings each including an external vertical slot, with the respective housings at said slots respectively having floating force transmitting connections with the respective rock shaft second arms for applying to the respective second arms the motion of the respective housings on operation of said power drive means, said rock shafts and said arms thereof being disposed relative to each other and the respective housings to define oppositely acting bell crank levers, and means for holding said devices against rotation on actuation of said power drive means thereof, whereby when said actuator devices are moved longitudinally of said guide shaft in opposite directions, said seat frame is moved vertically of said base.

6. The arrangement set forth in claim 5 wherein:
said means for holding said devices against rotation comprises:
said housings and said base having planar portions paralleling said way and in mutual engagement.

7. The arrangement set forth in claim 6 wherein:
said base comprises an elongate base plate,
said base plate having a flat medial portion and upstanding side portions on either side of same defining said operating way,
said side portions being formed to define opposed guideways on either side of said operating way and extending longitudinally of said operating way,
with said shafts having their said ends received in the respective guideways for supporting them for said shifting movement of said shafts.

8. The arrangement set forth in claim 7 wherein:
said base plate medial portion forms said planar portion of said base.

9. The arrangement set forth in claim 7 wherein:
said base plate includes flanges projecting from either side of same outwardly of said base plate side portions,
said base plate flanges being formed to receive connectors making said base plate fast against movement in its operative condition.

10. The arrangement set forth in claim 6 wherein:
said actuator device housings each include a parallelepiped portion, defining said planar portions thereof, and a round portion housing said rotary driven means thereof,
said guide shaft extending through the respective housing parallelepiped and round portions thereof with said guide shaft extending axially of said housing round portions,
said housings each having an electrical rotary motor secured to same to one side of same, with said motors being disposed on either side of said shaft and comprising said power drive means.

* * * * *